United States Patent [19]
Nekrasov et al.

[11] 3,784,385
[45] Jan. 8, 1974

[54] METHOD OF PREPARING MIX FOR PRODUCING REFRACTORY GAS CONCRETE AND THE PRODUCT OBTAINED THEREBY

[76] Inventors: Konstantin Dmitrievich Nekrasov, Bronitsky pereulock, 2, kv. 26; Alexandra Petrovna Tarasova, Bronitsky pereulok, 2, kv. 9; Alfred Avgustovich Bljusin, ulitsa Borisa Galushkina, 17, kv. 397; Tamara Petrovna Avdeeva, 4 Veshnyakovsky proezd, 5, korpus 1, kv. 48, all of Moscow; Vyacheslav Alexandrovich Elin, ultisa Lomonosova, 10, kv. 27, Moscow-Zhukovsky; Pavel Aronovich Roizman, ulitsa Bljukhera, 33/1, kv. 55, Temirtau Karagandinskaya Oblast; Alexandr Panteleevich Denisenko, ulitsa Mendeleeva, 10, kv. 4, Magnitogorsk, all of U.S.S.R.

[22] Filed: Feb. 18, 1972

[21] Appl. No.: 227,623

[52] U.S. Cl. .................. 106/40 R, 106/75, 106/84, 106/87, 106/97
[51] Int. Cl.. C04b 33/00, C04b 33/02, C04b 33/12
[58] Field of Search...................... 106/40 R, 78, 87, 106/75, 66

[56] References Cited
UNITED STATES PATENTS

| | | | |
|---|---|---|---|
| 3,382,082 | 5/1968 | Eubanks et al. .................. | 106/40 R |
| 2,109,532 | 3/1938 | Hill ....................................... | 106/87 |
| 2,915,802 | 12/1959 | Dugas .................................. | 106/87 |
| 3,700,470 | 10/1972 | Barton ................................. | 106/75 |

Primary Examiner—A. B. Curtis
Assistant Examiner—Mark Bell
Attorney—Eric H. Waters et al.

[57] ABSTRACT

Method of preparing a mix for producing refractory gas concrete containing powdered chrome-alumina slag and a high-alumina refractory material as fillers, comprising the mixing of constituents followed by adding a gas-developing agent. The resulting concrete is also subject of the invention.

4 Claims, No Drawings

METHOD OF PREPARING MIX FOR PRODUCING REFRACTORY GAS CONCRETE AND THE PRODUCT OBTAINED THEREBY

The present invention relates to a method of preparing a mix for producing refractory gas concrete, and to the product thus obtained, which can find application in various branches of the economy, particularly, in the metallurgical industry as a material for heat insulation and lining of heat-treating, annealing and open-hearth furnaces where a temperature of up to 1,200° C is to be maintained.

Nowadays, for high-temperature insulation use is made of costly critical lightweight and ultra-lightweight refractories, as well as of heat-insulation piece-articles. It proves difficult to run the work with these materials on an industrial scale. Besides, lightweight refractory piece-articles are manufactured by firing shaped pieces of materials, this involving additional cost and making the process of their manufacture more time-consuming.

It is therefore logical that the use of refractory gas concrete for the above-mentioned purposes would be quite expedient.

However, so far known in the art is only a refractory gas concrete with an operating temperature of up to 1,000° C, which is employed instead of lightweight refractories (or for heat insulation and lining of thermal units operating at a temperature of up to 1,000° C).

The method of producing such refractory gas concrete resides in that the components of a binder whose composition includes sodium silicate (crushed soluble glass) and a component containing dicalcium silicate are mixed with a filler and water, and then a gas-developing agent is added thereto.

As components containing dicalcium silicate, nepheline slurry, ferrochrome slag, or Portland cement can be used.

Chamotte is usually employed as a filler.

The refractory gas concrete produced from the mix prepared by the known method features high fire shrinkage (up to 2%), and its maximum operating temperature is 1,000° C.

It is an object of the present invention to provide a method of preparing a mix for producing refractory gas concrete featuring high thermal resistance (up to 1,200° C) and relatively low shrinkage (up to 1 percent).

The invention also has as its object to provide refractory gas concrete of the kind here disclosed.

These and other objects of the invention are accomplished in that, when preparing a mix for producing refractory gas concrete on the basis of a binder containing sodium silicate and nepheline slurry or ferrochrome slag, by mixing the components of the binder with water and subsequent adding a gas-developing agent, use is made as a filler of powdered chrome-alumina slag taken in an amount of 22 to 32 percent of the total weight of the mix and of a high-alumina refractory material taken in the same amount.

The essence of the present invention is as follows.

Chrome-alumina slag which is a waste product of the aluminothermic process of producing metallic chromium features an ability of expanding when subjected to wet heat treatment, and therefore its utilization as a filler in a mix for preparing refractory gas concrete allows a reduction of shrinkage phenomena and an increase of the temperature at which the gas concrete can be employed.

An averaged chemical composition of the slag used is presented in Table I.

Table I

| | Content of oxides, in wt.% | | | |
|---|---|---|---|---|
| $Al_2O_3$ | CaO + MgO | $Cr_2O_3$ | $Na_2O$ | $SiO_2$ |
| 75–80 | 4–10 | 5–10 | 3.5 | 0.7–1.0 |

The use of the chrome-alumina slag alone as a filler in the refractory gas concrete makes possible the production of a gas concrete with a strength of 5 to 8 $kg/cm^2$; therefore for increasing the strength characteristics of the refractory gas concrete a high-alumina refractory material is introduced into the mix, which allows an increase in the strength of the gas concrete to 12–20 kg per $cm^2$ and an increase of the temperature at which the gas concrete can operate.

A high-alumina powder prepared from wastes of broken high-alumina articles must contain not less than 62 percent of aluminum oxide.

Both the high-alumina refractory material and chrome-alumina slag must be ground to such a degree of fineness, that not less than 70 percent of a sample should pass through a sieve with a mesh of 4,900 apertures per $cm^2$.

The refractory and slag materials introduced into the gas concrete mix as fillers in the powdered state make it possible to obtain mixes with a homogeneous structure, this being a very important factor for producing cellular concretes.

The refractory gas concrete produced from the mix prepared by the present method has the following physicomechanical properties:

a) operation temperature — up to 1,200°C
b) ultimate compression strength after the maximum operating temperature — not less than 12 to 20 $kg/cm^2$
c) additional shrinkage at operating temperature — not higher than 1%
d) volume mass — not less than 500 to 800 $kg/m^3$ and over The cost of one ton of the refractory gas concrete with a volume mass of 600 $kg/m^3$ is 30 roubles as against 100 to 900 roubles per ton of the lightweight refractory material, in lieu of which the present gas concrete can be used. Moreover, the present gas concrete is based on cheap and easily available materials, so that its use is expedient from the economical standpoint. The process of producing refractory gas concrete practically does not differ from that of producing conventional autoclave concrete.

A gas concrete mixer is started and then charged with water preheated to 65° or 70° C, an aqueous solution of sodium silicate and sodium hydroxide; then powdered materials are introduced into the mixer: chrome-alumina slag, high-alumina refractory, finely ground sodium silicate and nepheline slurry or ferrochrome slag. The mix having been thoroughly mixed, aluminum powder mixed with a small quantity of water is introduced into the mix, and the resulting composition is thoroughly stirred again so as to preclude the commencement of gas evolution in the mixer.

On completion of the stirring the gas concrete mix is poured into metal moulds preheated to 38° to 42° C, and the mix is allowed to stay in the moulds at this temperature for a period of 3 to 5 hours.

After preliminary hardening of the articles, the "hump" is cut off from them, and the shaped articles are subjected to autoclave treatment by self-curing techniques.

With the help of electric heaters the temperature in the autoclave is maintained within 170° to 180° C.

The steam which evolves in the autoclave builds up a pressure which during 3 hours reaches 8 gauge atmospheres and is maintained at this level for 4 hours. Then the pressure is relieved to 0 during a period of 3 hours, and the gas concrete articles are removed from the autoclave. After that the articles are kept under shop conditions for 3 days at a temperature of 20° C to complete readiness.

For a better understanding of the inventive method and product, given hereinbelow are examples illustrating the compositions of the mix for refractory gas concrete.

EXAMPLE I

Composition of mix (in wt.%):
1. Filler: chrome-alumina slag — 22
   high-alumina refractory — 22
2. Finely ground soluble glass — 10
3. Nepheline slurry — 15
4. Aluminum powder — 0.13
5. Sodium hydroxide — 0.87
6. Aqueous solution of soluble glass with density of 1.38 — 17.5
7. Water — 12.5

The refractory gas concrete produced from said mix features the following properties:
volume mass — 600 kg/m$^3$
operation temperature — 1,200°C
ultimate compression strength after exposure to temperature of 1,200°C — 15 kg/cm$^2$
additional shrinkage after exposure to temperature of 1,200°C —1.0%

EXAMPLE 2

Composition of mix (in wt.%):
1. Filler: chrome-alumina slag — 28
   high-alumina refractory — 28
2. Finely ground soluble glass — 5.8
3. Nepheline slurry — 8.1
4. Aluminum powder — 0.20
5. Sodium hydroxide — 1.0
6. Aqueous solution of soluble glass with density of 1.38 — 15.2
7. Water — 13.7

The refractory gas concrete produced from said mix features the following properties:
volume mass — 600 kg/m$^3$
operation temperature — 1,200°C
ultimate compression strength after exposure to temperature of 1,200°C — 16 kg/cm$^2$
additional shrinkage after exposure to temperature of 1,200°C — 0.87%

EXAMPLE 3

Composition of mix (in wt.%):
1. Filler: chrome-alumina slag — 32
   high-alumina refractory — 32
2. Finely ground soluble glass — 6.9
3. Ferrochrome slag — 4.2
4. Aluminum powder — 0.10
5. Sodium hydroxide — 0.8
6. Aqueous solution of soluble glass with density of 1.38 — 13
7. Water — 11

The resulting refractory gas concrete features the following properties:
volume mass — 800 kg/m$^3$
operation temperature — 1,200°C
ultimate compression strength after exposure to operation temperature — 18 kg/cm$^2$
additional shrinkage after exposure to temperature of 1,200°C—0.87%

The strength of the refractory gas concrete is such that this concrete can be used instead of lightweight refractory articles for high-temperature insulation and lining of furnaces and thermal units operating at a temperature of up to 1,200° C.

The refractory gas concrete is fit for manufacturing large-size blocks therefrom, so that the erection of thermal units can be run on an industrial scale and the terms required for their construction can be reduced. Moreover, the use of the refractory gas concrete provides a possibility for developing most rational designs of furnaces, since articles of various configurations can be manufactured from this concrete.

Experimental 1,000 m$^3$ lots of the refractory gas concrete produced on an industrial scale have shown that this concrete can be mass-produced with the use of equipment employed at the now existing plants engaged in producing conventional cellular concrete, this circumstance materially facilitating rapid large-scale application of the new products. Unlike conventional gas concrete, the refractory gas concrete based on soluble glass can be subjected to "hump" removal procedures 2 hours after pouring it into the moulds, whereby labour efficiency is increased three-fold.

Blocks manufactured from the refractory gas concrete, which were mounted in furnaces and thermal units of metallurgical plants, proved to be reliable in operation.

What we claim is:

1. A refractory gas concrete having high thermal resistance, namely up to 1,200° C, and low shrinkage, namely below 1 percent, comprising a binder including sodium silicate, a finely ground filler consisting of chrome-alumina slag, in an amount of 22 to 32 percent of the total weight when mixed with said binder with the addition of water, a finely ground high-alumina refractory material in the same amount, said material being prepared from wastes of broken high-alumina articles containing at least 62 percent aluminum oxide, and a gas-developing agent selected from the group consisting of sodium hydroxide and aluminum powder.

2. The refractory gas concrete as defined in claim 1, wherein said binder further includes nepheline slurry.

3. The refractory gas concrete as defined in claim 1, wherein said binder further includes ferrochrome slag.

4. A method of preparing a mix for producing refractory gas concrete, comprising the steps of: mixing with water a finely ground binder, including sodium silicate, a finely ground filler consisting of powdered chrome-alumina slag, and a high-alumina refractory material prepared from wastes of broken high-alumina articles containing at least 62 percent aluminum oxide; and subsequently adding a gas-developing agent selected from the group consisting of sodium hydroxide and aluminum powder.

* * * * *